(12) United States Patent
Martinez

(10) Patent No.: US 9,153,082 B2
(45) Date of Patent: Oct. 6, 2015

(54) METHOD AND APPARATUS FOR ZONED ADMISSION TO PERFORMANCE EVENTS

(76) Inventor: Rogelio Martinez, Valencia, CA (US)

( * ) Notice: Subject to any disclaimer, the term of this patent is extended or adjusted under 35 U.S.C. 154(b) by 0 days.

(21) Appl. No.: 13/555,169

(22) Filed: Jul. 22, 2012

(65) Prior Publication Data

US 2013/0024219 A1  Jan. 24, 2013

Related U.S. Application Data

(63) Continuation of application No. 61/511,017, filed on Jul. 22, 2011.

(51) Int. Cl.
 *G06Q 10/02* (2012.01)
 *G07C 9/00* (2006.01)
 *G06Q 30/06* (2012.01)

(52) U.S. Cl.
 CPC ............ *G07C 9/00015* (2013.01); *G06Q 10/02* (2013.01); *G06Q 30/06* (2013.01); *G07C 9/00944* (2013.01)

(58) Field of Classification Search
 CPC ....................................................... G06Q 10/02
 See application file for complete search history.

(56) References Cited

U.S. PATENT DOCUMENTS

| | | | |
|---|---|---|---|
| 8,234,150 B1 * | 7/2012 | Pickton et al. ............... | 705/7.31 |
| 2005/0108912 A1 * | 5/2005 | Bekker ........................... | 40/633 |
| 2007/0298726 A1 * | 12/2007 | Fuqua .............................. | 455/73 |
| 2008/0059256 A1 * | 3/2008 | Lynch ............................... | 705/7 |
| 2009/0048936 A1 * | 2/2009 | Lerch et al. ...................... | 705/17 |
| 2010/0327002 A1 * | 12/2010 | Hegan et al. ..................... | 221/30 |
| 2011/0213630 A1 * | 9/2011 | Watkins .............................. | 705/5 |
| 2012/0022902 A1 * | 1/2012 | Gressel et al. .................... | 705/5 |
| 2012/0050069 A1 * | 3/2012 | Mercier et al. ............. | 340/932.2 |
| 2013/0119129 A1 * | 5/2013 | Amdahl et al. ................ | 235/381 |
| 2014/0067440 A1 * | 3/2014 | Stewart ............................. | 705/5 |

* cited by examiner

*Primary Examiner* — Tonya Joseph
(74) *Attorney, Agent, or Firm* — Panitch Schwarze Belisario & Nadel LLP

(57) ABSTRACT

A method and a device are disclosed including a software or physical admission certificate configured to allow admission of a spectator to a special admission zone with a view to a performance stage for a predefined duration of time. The special admission zone is usable by multiple spectators in multiple successive time periods during the same performance. In various embodiments, the special admission zone is created by partitioning a general admission zone adjacent to the performance stage. In other embodiments, the special admission zone may be constructed as a "catwalk" around the stage to provide elevated viewing. In still other embodiments, the special admission zone may be formed near indoor or outdoor stages. In various embodiments, the admission certificate may be embodied in a computing device such as a smartphone, while in other embodiments the admission certificate may be in the form of a RFID equipped wristband.

5 Claims, 5 Drawing Sheets

METHOD AND APPARATUS FOR ZONED ADMISSION TO PERFORMANCE EVENTS

CROSS-REFERENCE TO RELATED APPLICATION

This application claims the benefit of priority to U.S. Provisional Utility Application Ser. No. 61/511,017 filed Jul. 22, 2011.

TECHNICAL FIELD

This application relates generally to performance event management. More specifically, this application relates to providing zoned admission to a performance event using partitioned admission areas.

BRIEF DESCRIPTION OF THE DRAWINGS

The drawings, when considered in connection with the following description, are presented for the purpose of facilitating an understanding of the subject matter sought to be protected.

DETAILED DESCRIPTION

While the present disclosure is described with reference to several illustrative embodiments described herein, it should be clear that the present disclosure should not be limited to such embodiments. Therefore, the description of the embodiments provided herein is illustrative of the present disclosure and should not limit the scope of the disclosure as claimed. In addition, while following description references mobile phones and smartphones, it will be appreciated that the disclosure may be used with other types of mobile computing and communication devices, such as Personal Digital Assistants (PDA), netbook computers, tablet computers, and the like.

Briefly described, a device and a method are disclosed including a software or physical admission certificate configured to allow admission of a spectator to a special admission zone with a view to a performance stage for a predefined duration of time. The special admission zone is usable by multiple spectators in multiple successive time periods during the same performance. In various embodiments, the special admission zone is created by partitioning a general admission zone adjacent to the performance stage. In other embodiments, the special admission zone may be constructed as a "catwalk" around or on the stage or spectator occupiable baskets coupled to tethered helium balloons to provide elevated viewing. In still other embodiments, the special admission zone may be formed near indoor or outdoor stages. In various embodiments, the admission certificate may be embodied in a computing device such as a smartphone, while in other embodiments the admission certificate may be in the form of a RFID (Radio Frequency ID) equipped wristband.

With the advent of smartphones, and other high performance computing devices such as electronic pads and laptop computers, and with the ubiquity of Internet access at home, work, and public places, artistic performances, music, entertainment content, and other information contents such as lectures and the like, are easily available to people with unprecedented ease and quality. However, many people still enjoy the excitement and vitality of live performances on stage. In most successful entertainment events, the spectator crowds are large and each individual spectator may not be able to enjoy the performance to the degree desired because of remote proximity to the stage and view obstruction by other spectators. Additionally, purchasing tickets for front seats close to the stage is usually more expensive while such front seats are also limited in number and can only serve a limited number of spectators for each performance. It is desirable to provide better viewing opportunities for more people for live performances.

Illustrative Operating Environment

Figure 1:
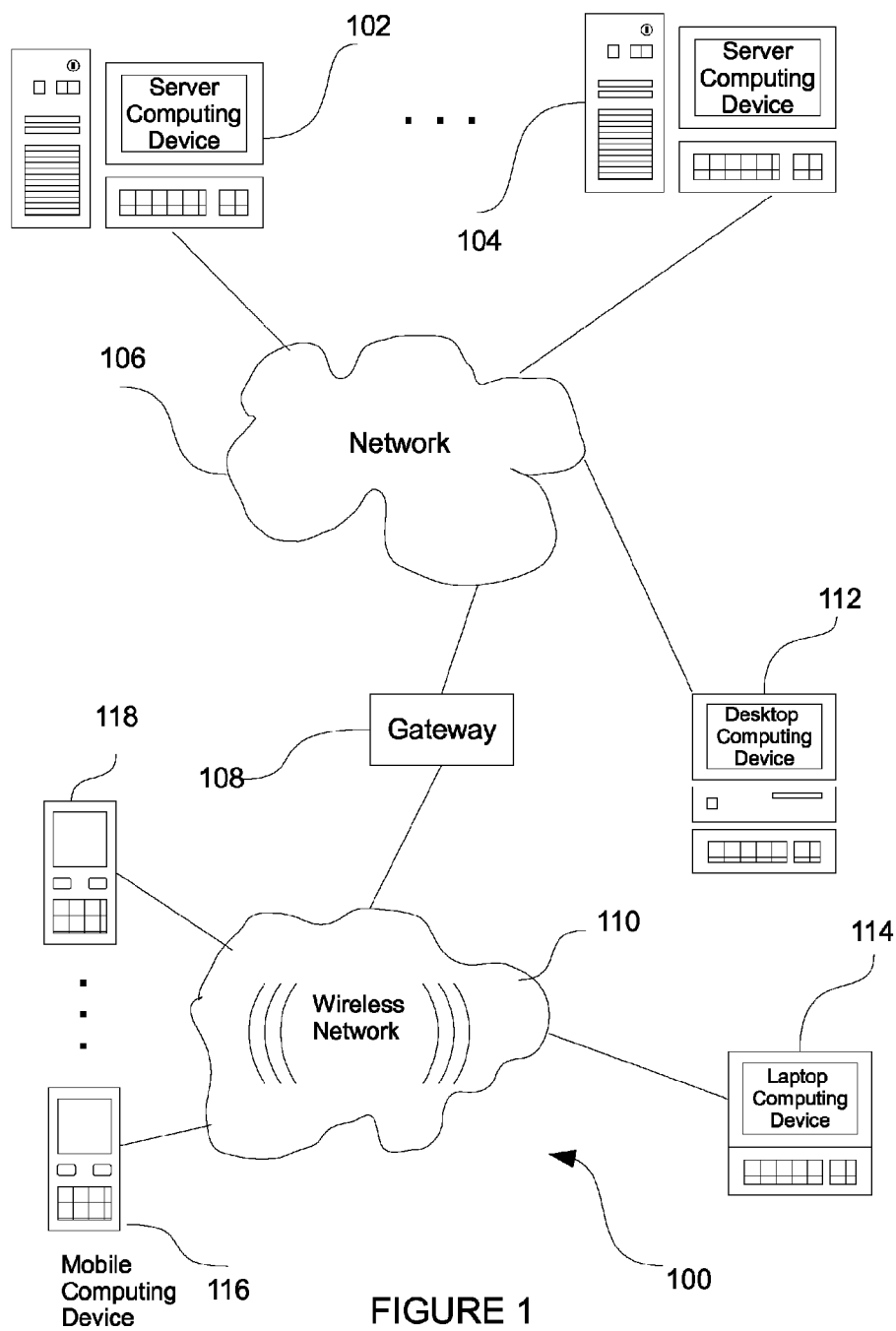
FIG. 1 shows an embodiment of a network computing environment wherein the disclosure may be practiced.

FIG. 1 shows components of an illustrative environment in which the disclosure may be practiced. Not all the shown components may be required to practice the disclosure, and variations in the arrangement and type of the components may be made without departing from the spirit or scope of the disclosure. System 100 may include Local Area Networks (LAN) and Wide Area Networks (WAN) shown collectively as Network 106, wireless network 110, gateway 108 configured to connect remote and/or different types of networks together, client computing devices 112-118, and server computing devices 102-104.

One embodiment of a computing device usable as one of client computing devices 112-118 is described in more detail below with respect to FIG. 2. Briefly, however, client computing devices 112-118 may include virtually any device capable of receiving and sending a message over a network, such as wireless network 110, or the like. Such devices include portable devices such as, cellular telephones, smart phones, display pagers, radio frequency (RF) devices, music players, digital cameras, infrared (IR) devices, Personal Digital Assistants (PDAs), handheld computers, laptop computers, wearable computers, tablet computers, integrated devices combining one or more of the preceding devices, or the like. Client device 112 may include virtually any computing device that typically connects using a wired communications medium such as personal computers, multiprocessor systems, microprocessor-based or programmable consumer electronics, network PCs, or the like. In one embodiment, one or more of client devices 112-118 may also be configured to operate over a wired and/or a wireless network.

Client devices 112-118 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphic may be displayed.

A web-enabled client device may include a browser application that is configured to receive and to send web pages, web-based messages, or the like. The browser application may be configured to receive and display graphic, text, multimedia, or the like, employing virtually any web based language, including a wireless application protocol messages (WAP), or the like. In one embodiment, the browser application may be enabled to employ one or more of Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send information.

Client computing devices 12-118 also may include at least one other client application that is configured to receive content from another computing device, including, without limit, server computing devices 102-104. The client application may include a capability to provide and receive textual content, multimedia information, or the like. The client application may further provide information that identifies itself, including a type, capability, name, or the like. In one embodiment, client devices 112-118 may uniquely identify themselves through any of a variety of mechanisms, including a phone number, Mobile Identification Number (MIN), an electronic serial number (ESN), mobile device identifier, network address, such as IP (Internet Protocol) address, Media Access Control (MAC) layer identifier, or other identifier. The identifier may be provided in a message, or the like, sent to another computing device.

Client computing devices 112-118 may also be configured to communicate a message, such as through email, Short Message Service (SMS), Multimedia Message Service (MMS), instant messaging (IM), internet relay chat (IRC), Mardam-Bey's IRC (mIRC), Jabber, or the like, to another computing device. However, the present disclosure is not limited to these message protocols, and virtually any other message protocol may be employed.

Client devices 112-118 may further be configured to include a client application that enables the user to log into a user account that may be managed by another computing device. Such user account, for example, may be configured to enable the user to receive emails, send/receive IM messages, SMS messages, access selected web pages, download scripts, applications, or a variety of other content, or perform a variety of other actions over a network. However, managing of messages or otherwise accessing and/or downloading content, may also be performed without logging into the user account. Thus, a user of client devices 112-118 may employ any of a variety of client applications to access content, read web pages, receive/send messages, or the like. In one embodiment, for example, the user may employ a browser or other client application to access a web page hosted by a Web server implemented as server computing device 102. In one embodiment, messages received by client computing devices 112-118 may be saved in non-volatile memory, such as flash and/or PCM, across communication sessions and/or between power cycles of client computing devices 112-118.

Wireless network 110 may be configured to couple client devices 114-118 to network 106. Wireless network 110 may include any of a variety of wireless sub-networks that may further overlay stand-alone ad-hoc networks, and the like, to provide an infrastructure-oriented connection for client devices 114-118. Such sub-networks may include mesh networks, Wireless LAN (WLAN) networks, cellular networks, and the like. Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), $4^{th}$ (4G) generation radio access for cellular systems, WLAN, Wireless Router (WR) mesh, and the like. Access technologies such as 2G, 3G, and future access networks may enable wide area coverage for mobile devices, such as client devices 114-118 with various degrees of mobility. For example, wireless network 110 may enable a radio connection through a radio network access such as Global System for Mobil communication (GSM), General Packet Radio Services (GPRS), Enhanced Data GSM Environment (EDGE), WEDGE, Bluetooth, High Speed Downlink Packet Access (HSDPA), Universal Mobile Telecommunications System (UMTS), Wi-Fi, Zigbee, Wideband Code Division Multiple Access (WCDMA), and the like. In essence, wireless network 110 may include virtually any wireless communication mechanism by which information may travel between client devices 102-104 and another computing device, network, and the like.

Network 106 is configured to couple one or more servers depicted in FIG. 1 as server computing devices 102-104 and their respective components with other computing devices, such as client device 112, and through wireless network 110 to client devices 114-118. Network 106 is enabled to employ any form of computer readable media for communicating information from one electronic device to another. Also, network 106 may include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another.

Communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. Network 106 may include any communication method by which information may travel between computing devices. Additionally, communication media typically may enable transmission of computer-readable instructions, data structures, program modules, or other types of content, virtually without limit. By way of example, communication media includes wired media such as twisted pair, coaxial cable, fiber optics, wave guides, and other wired media and wireless media such as acoustic, RF, infrared, and other wireless media.

Illustrative Computing Device Configuration

Figure 2:
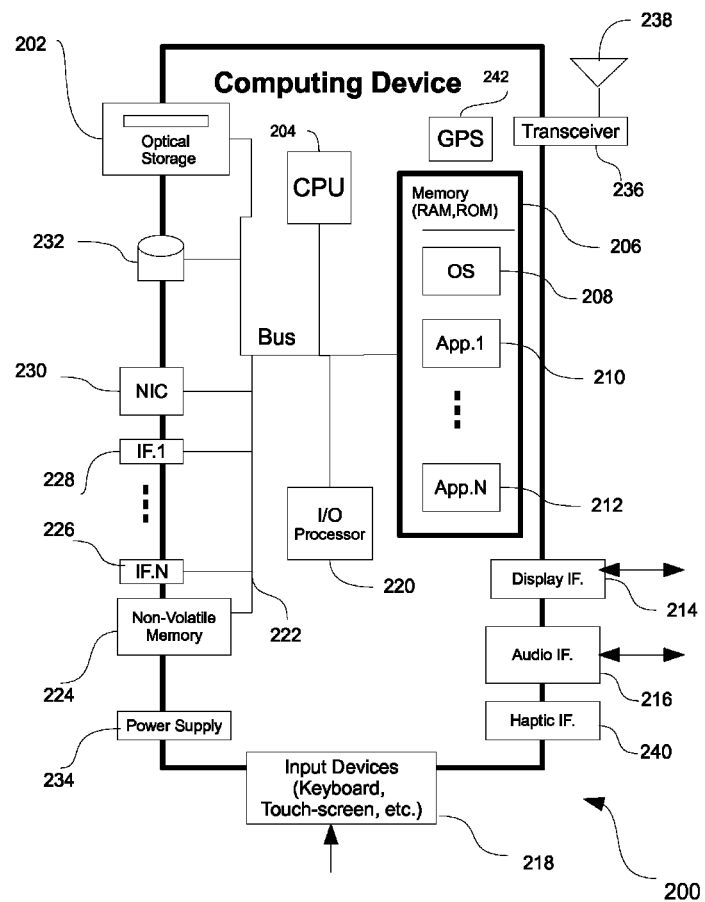
FIG. 2 shows an embodiment of a computing device that may be used in the network computing environment of FIG. 1.

FIG. 2 shows an illustrative computing device 200 that may represent any one of the server and/or client computing devices shown in FIG. 1. A computing device represented by computing device 200 may include less or more than all the components shown in FIG. 2 depending on the functionality needed. For example, a mobile computing device may include the transceiver 236 and antenna 238, while a server computing device 102 of FIG. 1 may not include these components. Those skilled in the art will appreciate that the scope of integration of components of computing device 200 may be different from what is shown. As such, some of the components of computing device 200 shown in FIG. 2 may be integrated together as one unit. For example, NIC 230 and transceiver 236 may be implemented as an integrated unit. Additionally, different functions of a single component may be separated and implemented across several components instead. For example, different functions of I/O processor 220 may be separated into two or more processing units.

With continued reference to FIG. 2, computing device 200 includes optical storage 202, Central Processing Unit (CPU) 204, memory module 206, display interface 214, audio interface 216, input devices 218, Input/Output (I/O) processor 220, bus 222, non-volatile memory 224, various other interfaces 226-228, Network Interface Card (NIC) 320, hard disk 232, power supply 234, transceiver 236, antenna 238, haptic interface 240, and Global Positioning System (GPS) unit 242. Memory module 206 may include software such as Operating System (OS) 208, and a variety of software application programs 210-212. Computing device 200 may also include other components not shown in FIG. 2. For example, computing device 200 may further include an illuminator (for example, a light), graphic interface, and portable storage media such as USB drives. Computing device 200 may also include other processing units, such as a math co-processor, graphics processor/accelerator, and a Digital Signal Processor (DSP).

Optical storage device 202 may include optical drives for using optical media, such as CD (Compact Disc), DVD (Digital Video Disc), and the like. Optical storage devices 202 may provide inexpensive ways for storing information for archival and/or distribution purposes.

Central Processing Unit (CPU) 204 may be the main processor for software program execution in computing device 200. CPU 204 may represent one or more processing units that obtain software instructions from memory module 206 and execute such instructions to carry out computations and/or transfer data between various sources and destinations of data, such as hard disk 232, I/O processor 220, display interface 214, input devices 218, non-volatile memory 224, and the like.

Memory module 206 may include RAM (Random Access Memory), ROM (Read Only Memory), and other storage means, mapped to one addressable memory space. Memory module 206 illustrates one of many types of computer storage media for storage of information such as computer readable instructions, data structures, program modules or other data. Memory module 206 may store a basic input/output system (BIOS) for controlling low-level operation of computing device 200. Memory module 206 may also store OS 208 for controlling the general operation of computing device 200. It will be appreciated that OS 208 may include a general-purpose operating system such as a version of UNIX, or LINUX™, or a specialized client communication operating system such as Windows Mobile™, or the Symbian® operating system. OS 208 may, in turn, include or interface with a Java virtual machine (JVM) module that enables control of hardware components and/or operating system operations via Java application programs.

Memory module 206 may further include one or more distinct areas (by address space and/or other means), which can be utilized by computing device 200 to store, among other things, applications and/or other data. For example, one area of memory module 206 may be set aside and employed to store information that describes various capabilities of computing device 200, a device identifier, and the like. Such identification information may then be provided to another device based on any of a variety of events, including being sent as part of a header during a communication, sent upon request, or the like. One common software application is a browser program that is generally used to send/receive information to/from a web server. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web based languages may also be employed. In one embodiment, using the browser application, a user may view an article or other content on a web page with one or more highlighted portions as target objects.

Display interface 214 may be coupled with a display unit (not shown), such as liquid crystal display (LCD), gas plasma, light emitting diode (LED), or any other type of display unit that may be used with computing device 200. Display units coupled with display interface 214 may also include a touch sensitive screen arranged to receive input from an object such as a stylus or a digit from a human hand. Display interface 214 may further include interface for other visual status indicators, such Light Emitting Diodes (LED), light arrays, and the like. Display interface 214 may include both hardware and software components. For example, display interface 214 may include a graphic accelerator for rendering graphic-intensive outputs on the display unit. In one embodiment, display interface 214 may include software and/or firmware components that work in conjunction with CPU 204 to render graphic output on the display unit.

Audio interface 216 is arranged to produce and receive audio signals such as the sound of a human voice. For example, audio interface 216 may be coupled to a speaker and microphone (not shown) to enable communication with a human operator, such as spoken commands, and/or generate an audio acknowledgement for some action.

Input devices 218 may include a variety of device types arranged to receive input from a user, such as a keyboard, a keypad, a mouse, a touchpad, a touch-screen (described with respect to display interface 214), a multi-touch screen, a microphone for spoken command input (describe with respect to audio interface 216), and the like.

I/O processor 220 is generally employed to handle transactions and communications with peripheral devices such as mass storage, network, input devices, display, and the like, which couple computing device 200 with the external world. In small, low power computing devices, such as some mobile devices, functions of the I/O processor 220 may be integrated with CPU 204 to reduce hardware cost and complexity. In one embodiment, I/O processor 220 may be the primary software interface with all other device and/or hardware interfaces, such as optical storage 202, hard disk 232, interfaces 226-228, display interface 214, audio interface 216, and input devices 218.

An electrical bus 222 internal to computing device 200 may be used to couple various other hardware components, such as CPU 204, memory module 206, I/O processor 220, and the like, to each other for transferring data, instructions, status, and other similar information.

Non-volatile memory 224 may include memory built into computing device 200, or portable storage medium, such as USB drives that may include PCM arrays, flash memory including NOR and NAND flash, pluggable hard drive, and the like. In one embodiment, portable storage medium may behave similarly to a disk drive. In another embodiment, portable storage medium may present an interface different than a disk drive, for example, a read-only interface used for loading/supplying data and/or software.

Various other interfaces 226-228 may include other electrical and/or optical interfaces for connecting to various hardware peripheral devices and networks, such as IEEE 1394 also known as FireWire, Universal Serial Bus (USB), Small Computer Serial Interface (SCSI), parallel printer interface, Universal Synchronous Asynchronous Receiver Transmitter (USART), Video Graphics Array (VGA), Super VGA (SVGA), and the like.

Network Interface Card (NIC) 230 may include circuitry for coupling computing device 200 to one or more networks, and is generally constructed for use with one or more communication protocols and technologies including, but not limited to, Global System for Mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth, Wi-Fi, Zigbee, UMTS, HSDPA, WCDMA, WEDGE, or any of a variety of other wired and/or wireless communication protocols.

Hard disk 232 is generally used as a mass storage device for computing device 200. In one embodiment, hard disk 232 may be a Ferro-magnetic stack of one or more disks forming a disk drive embedded in or coupled to computing device 200. In another embodiment, hard drive 232 may be implemented as a solid-state device configured to behave as a disk drive, such as a flash-based hard drive. In yet another embodiment, hard drive 232 may be a remote storage accessible over network interface 230 or another interface 226, but acting as a local hard drive. Those skilled in the art will appreciate that other technologies and configurations may be used to present a hard drive interface and functionality to computing device 200 without departing from the spirit of the present disclosure.

Power supply 234 provides power to computing device 200. A rechargeable or non-rechargeable battery may be used to provide power. The power may also be provided by an external power source, such as an AC adapter or a powered docking cradle that supplements and/or recharges a battery.

Transceiver 236 generally represents transmitter/receiver circuits for wired and/or wireless transmission and receipt of electronic data. Transceiver 236 may be a stand-alone module or be integrated with other modules, such as NIC 230. Transceiver 236 may be coupled with one or more antennas for wireless transmission of information.

Antenna 238 is generally used for wireless transmission of information, for example, in conjunction with transceiver 236, NIC 230, and/or GPS 242. Antenna 238 may represent one or more different antennas that may be coupled with different devices and tuned to different carrier frequencies configured to communicate using corresponding protocols and/or networks. Antenna 238 may be of various types, such as omni-directional, dipole, slot, helical, and the like.

Haptic interface 240 is configured to provide tactile feedback to a user of computing device 200. For example, the haptic interface may be employed to vibrate computing device 200, or an input device coupled to computing device 200, such as a game controller, in a particular way when an event occurs, such as hitting an object with a car in a video game.

Global Positioning System (GPS) unit 242 can determine the physical coordinates of computing device 200 on the surface of the Earth, which typically outputs a location as latitude and longitude values. GPS unit 242 can also employ other geo-positioning mechanisms, including, but not limited to, triangulation, assisted GPS (AGPS), E-OTD, CI, SAI, ETA, BSS or the like, to further determine the physical location of computing device 200 on the surface of the Earth. It is understood that under different conditions, GPS unit 242 can determine a physical location within millimeters for computing device 200. In other cases, the determined physical location may be less precise, such as within a meter or significantly greater distances. In one embodiment, however, a mobile device represented by computing device 200 may, through other components, provide other information that may be employed to determine a physical location of the device, including for example, a MAC address.

Figure 3:
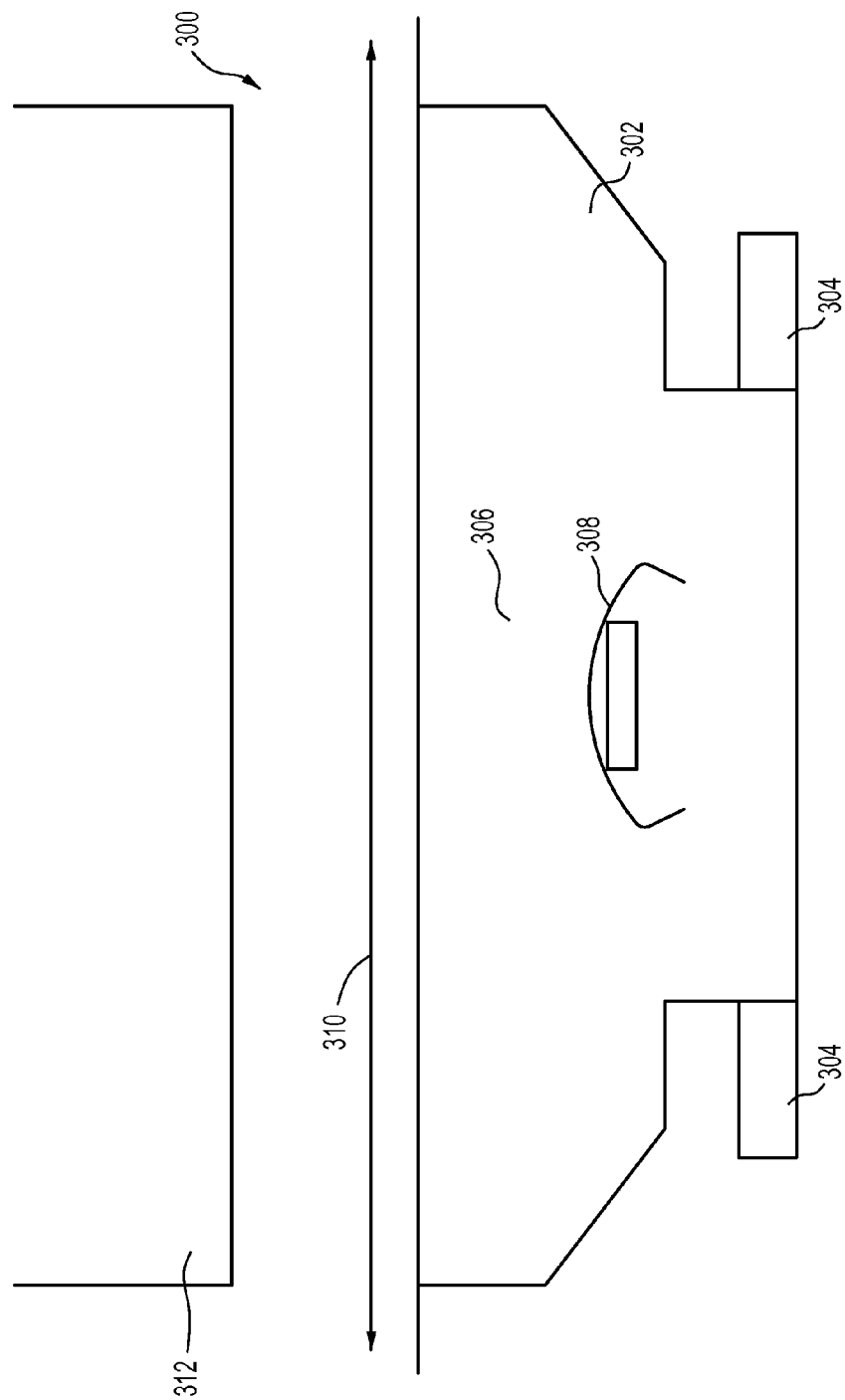
FIG. 3 shows an example performance stage.

FIG. 3 shows an example performance stage. Stage arrangement 300 generally may include a stage 302 having an exposed width 310, ramps 304, performance area 306 for performers, DJ (Disk Jockey) booth 308, and general seating area 312 for spectators.

Spectators are allowed, usually after presenting an admission ticket, into general seating area 312 to view the performance of performers on the stage. The seating in the general admission area may be priced differently depending on proximity to the stage, with the front seats generally being more expensive.

Stage arrangement 300 may include other seating areas in addition to the general seating area. For example, some performance buildings may include "box" seating areas arranged as private or semi-private balcony booths in elevated positions around the stage. Other seating arrangements may include seating as well as standing locations to accommodate more spectators. In such conventional stage arrangements, front row seating close to the stage is limited and expensive.

Other vantage points for stage 302 include "catwalks", service walkways usually constructed above, on, and/or around the perimeter of the stage to provide lighting, microphones, camera and video recording, electrical and mechanical services, special effects, and the like.

Figure 4:
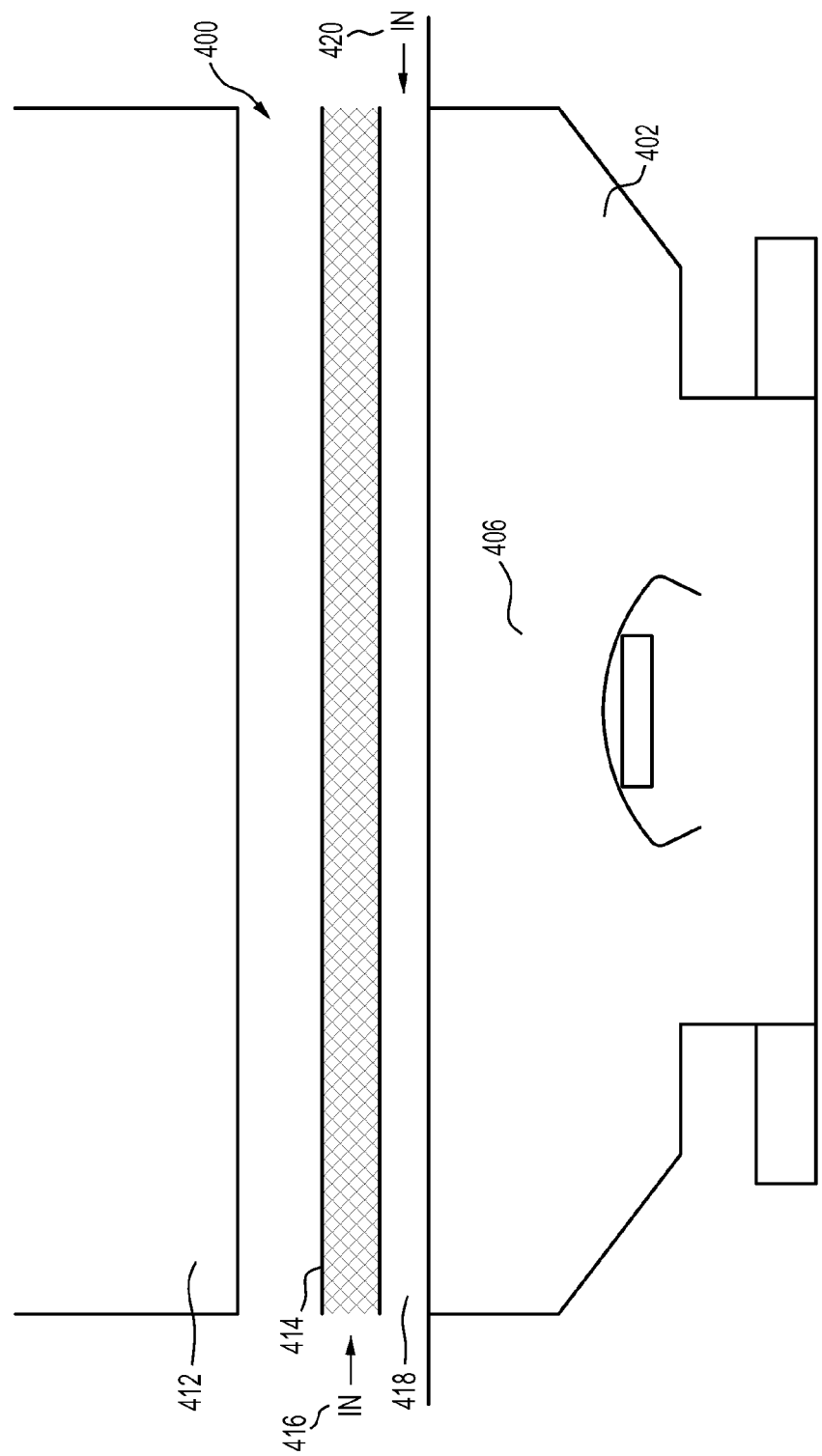
FIG. 4 shows an example performance stage with partitioned admission areas forming special admission zones.

FIG. 4 shows an example performance stage with partitioned admission areas forming special admission zones. In various embodiments, stage arrangement 400 includes stage 402, performance area 406, general seating area 412, and special admission zones 414 and 418 having entrance and/or exit ports 416 and 420, respectively.

In various embodiments, special admission certificates are used to admit spectators to the special spectator zones. Such special admission certificates may be standalone admission tickets or be in addition to the regular admission tickets to the performance event. A spectator or patron of the performance event who is admitted to special admission zones 414 and 418 may generally enjoy enhanced audio and visual experience in comparison to general seating area 412. Additionally, the patron admitted to the special zones may also have the opportunity to meet and greet some of the performers.

In some embodiments, the special admission zone may be a separate barricade/barrier zone just behind a media and/or security barricade/barrier zone located directly at the front of each performance stage. This parallel special admission zone may cover the entire front of the performance stage from one end to the other. In some embodiments, the special admission zone may feature "soft floors", heavy duty floors used to reduce the impact on the patron's feet, ankles, and knees when dancing or jumping. The designated space may also feature a special HVAC (Heating Ventilating and Air Conditioning) system, such as bladeless cooling system to keep the patron cool. The designated space may also feature a single or double sided video and/or still image camera which may be operated manually or automatically for video and still images of the artists/performers and patrons during the performance event.

The performance events may include music concerts, sporting events, lectures, theatrical performances, political events, and any other similar live events.

In various embodiments, the special admission certificate is for a particular event and a particular showing, while in other embodiments, the special admission certificate is for a series of events, multiple different events, various showings of the same event, or any combination of the above.

In some embodiments, the special admission certificate authorizes the holder to enter the special spectator zones for a limited amount of time during the performance. For example, the certificate may allow the patron to stay in the special admission zone for 10 minutes. After the 10 minutes has expired, other patrons with special admission certificates are allowed in the special admission zone during the same performance event. Using this rotation process, more people than the capacity of the special admission zone may utilize (or rotate through) the benefits of the special admission zone. For example, if the special admission zone has capacity for 100 special spectators, and each spectator spends 10 minutes in the special admission zone for an event that lasts two hours, then a total of 120 minutes/10 minutes=12 time slots×100 spectators=1200 special spectators may enjoy the special benefits of the special admission zone. Each such 10 minute interval, thus, forms a rotation cycle by which different patrons may rotate through the special admission zone.

In other embodiments, the special admission certificate allows the patron to stay in the special admission zone for the duration of the whole performance of a given performer of a multi-performer event. Those skilled in the art will appreciate that many service combinations may be offered by the special admission certificate. For example, a few examples of such arrangement are described below.

Front stage pass—the patron purchases a limited length of time within a designated space, such as the special admission zones, located at the front of the performance stage for a specific performance at a specific event.

Front stage pass VIP—the patron purchases an extended length of time within a designated space, located at the front of the performance stage for a specific performance at a specific event.

On stage pass—the patron purchases a limited length of time on the "catwalk" located inside a purpose built structure on the performance stage for a specific performance at a specific event.

On stage pass VIP—the patron purchases an extended length of time in one of the many private and hosted "hollywood style squares" located inside a purpose built structure on the performance stage for a specific performance at a specific event.

Air stage pass—the patron purchases a limited length of time on a "tethered hot air balloon, tethered helium balloon, helicopter, airplance or blimp" flying above the entire venue for a specific performance at a specific event.

Air stage pass VIP—the patron purchases an extended length of time on a "tethered hot air balloon, tethered helium balloon, helicopter, airplance or blimp" flying above the entire venue for a specific performance at a specific event.

All stage pass—the patron is buying a pass for the entire experience. In various embodiments, the special admission certificate is implemented as a "hard" or physical certificate, while in other embodiments, it is implemented as a "soft" or digital certificate, for example, in the form of a smartphone application.

In some embodiments, the hard certificate is in the form of a magnetic or RFID embedded card, while in other embodiments, it is in the form of an RFID embedded wristband. Entry into the special admission zone may be done primarily via an unmanned turnstile with RFID chip reader, and/or a handheld reader RFID.

Figure 5:
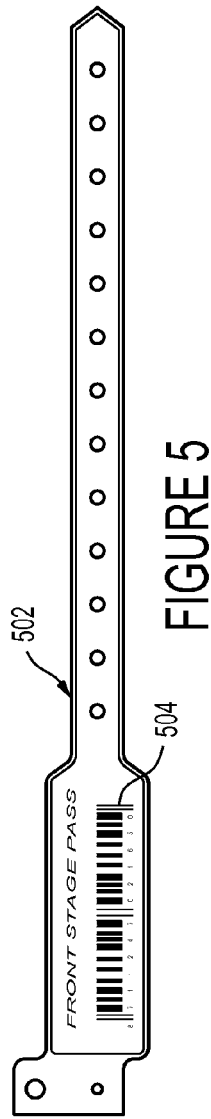
FIG. 5 shows an example wristband for control of admission to special admission zones.

FIG. 5 shows an example wristband for control of admission to special admission zones. In some embodiments, wristband 502 includes barcode 504. The hard certificate may be mailed to the purchaser prior to the event or be picked up on the event site or another location such as a ticket office by the purchaser. The RFID may be of the Near Field Communication (NFC) type for close proximity data transfer. The hard certificate may further include a unique barcode or other scannable pattern to include certificate identification and/or other information. The hard certificate may also include a unique serial number which may be used to validate the certificate at the event. The predetermined mailed or transfer date in conjunction with the unique barcode and serial number may be used to substantially eliminate or minimize counterfeiting.

Figure 6:
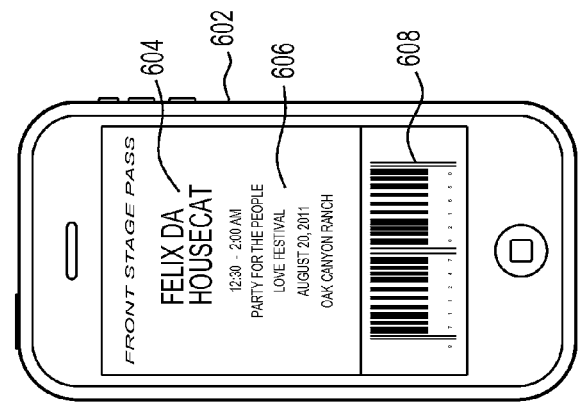
FIG. 6 shows an example mobile device having a barcoded admission certificate for admission to special admission zones.

FIG. 6 shows an example mobile device having a barcoded admission certificate for admission to special admission zones. In various embodiments, mobile computing device 602 is configured to display digital certificate 606 including event title 604 and unique barcode and/or serial number 608. In some embodiments, the digital version of the certificate may include the unique barcode and serial number for the same purpose as the hard version, described above. The digital version may be transmitted to the purchaser's registered smartphone or other computing device prior to the event. The computing device may be any one of the devices described with respect to FIG. 2.

In various embodiments, the RFID chip may be inlayed within a wristband, personal electronic device, smartphone or smartwatch and the like. The application (or "App") on the mobile device may apply to concerts, festivals, or other live entertainment. The patron may buy the special admission certificate for a specific length of time, such as a limited number of minutes, a block of time for long performances or it may be for the entire performance of a specific artist, performer or athlete, as described above with respect to FIG. 4. Those skilled in the art will appreciate that other combinations of time periods may be purchased and associated with the certificate without departing from the spirit of the present disclosure.

In various embodiments, when the RFID chip is read via the RFID hand-held, stand-alone, or smartphone reader, a "push" (data transfer initiated externally to the receiver) may be sent to a previously selected social media site associated with the patron. The social media push may be sent when video or still images are generated by the patron, by special admission service providers, or by service affiliates via an on-site automated photo booth or professional photographer. A live or pre-recorded video feed may also be streamed or televised or transmitted via various predetermined web channels.

Those skilled in the art will appreciate that the special admission certificates may be purchased through appropriate websites via a personal electronic device, smartphone, or smartwatch application. The special admission certificates may also be purchased through an authorized ticket agent, event website, performer website, sponsor website, promoter website, other partner websites, and on-site at a stand-alone kiosk. In some embodiments, sponsorship opportunities may exist for the sponsor to pay for the patron's individual or entire experience via sweepstakes, drawings, raffles, lottery, contests or giveaways. In some embodiments, special admission certificates may be purchased as a gift or be transferable between patrons.

In various embodiments, the RFID (NFC) technology may be the primary device used to verify access to the special admission zones. The RFID technology may also be used to identify patrons with regards to social media, promotions (for examples, coupons), rewards points and "tap to pay" cashless payment systems used for merchandising, food, beverage, concessions, parking and digital music sales.

In some embodiments, marketing and advertising may be performed via print, television, radio, on-site, third party partners, sponsors, and various social networking and other media on the web, such as Twitter, Facebook, Youtube, Soundcloud, Mixcloud, Tumblr, Wordpress, Flavors.me Myspace, Instagram, Turntable.fm, Spotify, Flicr, Hypemachine, Linkedin, Google+, Pandora, Wikipedia, and the like.

In various embodiments, patrons with the special admission certificate may be provided with a separate entrance into the event including a separate parking lot and air conditioned area with various other amenities.

Changes can be made to the claimed invention in light of the above Detailed Description. While the above description details certain embodiments of the invention and describes the best mode contemplated, no matter how detailed the above appears in text, the claimed invention can be practiced in many ways. Details of the system may vary considerably in its implementation details, while still being encompassed by the claimed invention disclosed herein.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the claimed invention to the specific embodiments disclosed in the specification, unless the above Detailed Description section explicitly defines such terms.

Accordingly, the actual scope of the claimed invention encompasses not only the disclosed embodiments, but also all equivalent ways of practicing or implementing the claimed invention.

Ticket Splitting Embodiment

Ticket Split is a collaborative use method that splits a single ticket so that multiple people can benefit from it.

Ticket Split is a new way to split the use of an event ticket with another person or multiple people depending on the number of performers.

Ticket Split is a great option for SELLER—a person that doesn't want to go to an entire event.

Ticket Split is a great option for a BUYER—a person who normally couldn't attend an event because it was sold out or who can't afford it.

Ticket Split benefits Event Organizers and Venues during sold out events, by accommodating more people into the event without exceeding the capacity limits set for the venue.

Event Attendees can also Ticket Split their tickets with people that are attending the same event. This allows for multiple people to have the ability to experience an event from different vantage points.

Ticket Split works at concerts, music festivals, sporting and other public or private events.

Ticket Split gives a SELLER the opportunity to sell a portion of their event experience.

SELLER can Ticket Split with BUYER any portion of an event which includes but isn't limited to a Performance, Act, DJ Set, Race, Round, Quarter, Half, Bout, Match or Block of Time.

By using Ticket Split, SELLER can recuperate a portion of their ticket cost.

By using Ticket Split, BUYER has the opportunity to attend a portion of an event.

SELLER can set the price and the amount of times their ticket will be split.

SELLER can choose to auction their Ticket Split and set a reserve price instead of a straight sale.

SELLER can stimulate Ticket Split sales by selecting manual or automated "Dynamic Ticket Selling", simply by entering the Floor and Ceiling price limits (Minimum and Maximum). BUYER can also select to purchase tickets by selecting manual or automated "Dynamic Ticket Buying", simply by entering the Floor and Ceiling price limits.

Nothing will be mailed between SELLER and BUYER because the tickets will be split electronically.

Before a SELLER can Ticket Split their ticket, the ticket must be authenticated and their credit card must be validated to protect unsuspecting BUYER against fraud.

Ticket Split will authenticate the original ticket with the ticket manufacturer before it's eligible for sale. This will protect BUYER from the sale of counterfeit tickets.

Tickets will be authenticated via the "Ticket Split" mobile app on a SELLER'S Smartphone, using the phone's built-in camera to scan the ticket's bar code or by manually entering the ticket's serial number.

The Ticket Split mobile phone app will alert SELLER and BUYER upon a successful transaction.

Tickets can also be authenticated by using a Tablet's built-in camera to scan the ticket's bar code or by manually entering the ticket's serial number.

Tickets can also be authenticated by using a Computer's web camera to scan the ticket's bar code or by manually entering the ticket's serial number.

SELLER will pay a non-refundable "Authentication Fee" for each ticket sold on Ticket Split.

Ticket Split will share a portion of the "Authentication Fee" with the original ticket manufacturer.

The SELLER'S original ticket is converted into an encrypted mobile ticket upon the BUYER'S purchase.

Once the ticket is split the original ticket will be voided and the SELLER will also receive a mobile ticket.

If the voided "Original" ticket is used at the event, the SELLER will forfeit all net proceeds to them.

This will prevent SELLER from selling voided tickets to unsuspecting BUYER outside of Ticket Split BUYER will pay a non-refundable "Electronic Transfer Fee" when the ticket is transferred to them.

SELLER will pay a commission to Ticket Split for providing the service.

BUYER will pay a commission to Ticket Split for providing the service.

Ticket Split will share a portion of the commission with the Event Organizer.

The Transfer Insurance Coverage (T.I.C) will be paid by the ticket transferor for the benefit of the transferee.

Both SELLER and BUYER can be the transferor and the transferee depending on the circumstance.

The Transfer Insurance Coverage will vary depending on the circumstance.

The transferor will be obligated to pay the T.I.C. if they fail to fulfill their obligation to the transferee.

Failure to perform includes but isn't limited to, deciding to stay or forgetting to leave the event.

Once the transferor exits the event, the transferee's ticket becomes active for use.

Exit of the venue may be confirmed by activating the smart phone location based GPS.

No more than one Ticket Split will be active from the original ticket at the same time.

Commissions will not be charged to the SELLER if the tickets weren't sold (Split).

Event Organizer's will provide a staging area to expedite the rotation between transferor and transferee.

If an event is canceled, postponed or if the performer/athlete fails to show up, all monies will be refunded except for the SELLER'S "Authentication Fee" and the BUYER'S "Electronic Transfer Fee".

Ticket Split tickets are transferable as long as the new BUYER agrees to the terms and conditions.

Each time the tickets are transferred, the new recipient will pay an "Electronic Transfer Fee".

Event Organizers & Venues will be required to provide a designated entrance and exit at the event.

Event Organizers & Venues will be responsible for the cost of providing a manned or unmanned event ticket attendant.

In & Outs will not be permitted at the events.

BUYER will be charged once they've purchased their ticket on Ticket Split website or mobile App.

The BUYER'S monies will be escrowed into a trustee account and will be paid to the SELLER after the event.

SELLER will have the option to have their money transferred into their bank account, transferred to a debit card, transferred to their Pay Pal account or elect to have a check mailed to them.

Event Organizers will provide the set times for each Ticket Split event.

If the Event Organizer fails to provide accurate set times, fails to communicate scheduling changes or artist/athlete cancellations, the Event Organizer will forfeit commissions and reimburse the effected SELLER or BUYER for damages.

SELLER and BUYER will create a profile on Ticket Split so that their customers can rate their service.

SELLER and BUYER will also be able to rate the Event Organizers, the Venues and the overall event experience.

SELLER and BUYER can earn rewards points each time they use Ticket Split.

BUYER Rewards Points will be based on purchase history.

SELLER Rewards Points will be based on BUYER'S ratings.

These reward points can be redeem for reduced commissions on future Ticket Split transactions.

If a SELLER repeatedly tries to beat the system by cheating unsuspecting BUYERS, they will be banned from using Ticket Split The actions of unscrupulous SELLERS will be monitored by the credit card they register and by the serial number and I.P. address of the phones, tablets and computers they're using to sell tickets on Ticket Split.

The above specification, examples, and data provide a complete description of the use of the claimed invention. Since many embodiments of the invention can be made without departing from the spirit and scope of the invention, the invention resides in the claims hereinafter appended. It is further understood that this disclosure is not limited to the disclosed embodiments, but is intended to cover various arrangements included within the spirit and scope of the broadest interpretation so as to encompass all such modifications and equivalent arrangements.

What is claimed is:

1. A system for controlling admission to a special admission zone of a live performance event for a plurality of patrons, wherein the special admission zone is separate and distinct from a general admission area of the event and has a fixed maximum capacity, and the duration of the event is divided into a plurality of predefined time periods, the system comprising:

(a) a set of patron-issued wristbands containing electronically writeable and readable RFID chips, the RFID chips of each wristband electronically encoded with a respective unique serial number that is electronically associated with one of the plurality of predefined time periods, wherein the total number of wristbands that are assigned unique serial numbers for all of the predefined time periods is a multiple of the fixed maximum capacity of the special admission zone; and (b) a processor programmed to verify, when each patron in possession of a wristband requests entry to the special admission zone and the RFID chips of their wristbands are electronically read to obtain their respective unique serial numbers, that the unique serial number encoded in the wristband that is in possession of each patron is (i) valid, and (ii) that the current time matches the predefined time period associated with the unique serial number of the wristband, wherein admission to the special admission zone is permitted upon successful verification, and wherein the system allows a different set of patrons to be rotated through the special admission zone during successive predefined time periods.

2. The system of claim 1 wherein the RFID chip uses RFID of a Near Field Communication (NFC) type.

3. The system of claim 1 wherein the live performance event is one of a music concert, a music festival, a theatrical performance, a sports event, and a lecture.

4. A system for controlling admission to a special admission zone of a live performance event for a plurality of patrons, wherein the special admission zone is separate and distinct from a general admission area of the event and has a fixed maximum capacity, and the duration of the event is divided into a plurality of predefined time periods, the system comprising:

(a) a set of patron-owned mobile devices containing memory that receive and store the respective unique serial numbers, each mobile device electronically storing a unique serial number in the memory that is electronically associated with one of the plurality of predefined time periods, each mobile device including a display that electronically displays its stored unique serial number, wherein the total number of mobile devices that are assigned unique serial numbers for all of the predefined time periods is a multiple of the fixed maximum capacity of the special admission zone; and (b) a processor programmed to verify, when each patron in possession of a mobile device requests entry to the special admission zone and their mobile devices are electronically read by reading the electronically displayed unique serial numbers on respective displays of the mobile devices, that the unique serial number stored in the mobile device that is in possession of each patron is (i) valid, and (ii) that the current time matches the predefined time period associated with the unique serial number of the mobile device, wherein admission to the special admission zone is permitted upon successful verification, and wherein the system allows a different set of patrons to be rotated through the special admission zone during successive predefined time periods.

5. The system of claim 4 wherein the live performance event is one of a music concert, a music festival, a theatrical performance, a sports event, and a lecture.

* * * * *